(12) United States Patent
Hsieh

(10) Patent No.: US 9,986,845 B1
(45) Date of Patent: Jun. 5, 2018

(54) NET FIXING STRUCTURE OF CHAIR

(71) Applicant: SHINMAOFENG OFFICE FURNITURE CO., LTD., Tainan (TW)

(72) Inventor: Feng-Tien Hsieh, Tainan (TW)

(73) Assignee: Shinmaofeng Office Furniture Co., Ltd., Tainan (TW)

( * ) Notice: Subject to any disclaimer, the term of this patent is extended or adjusted under 35 U.S.C. 154(b) by 46 days.

(21) Appl. No.: 15/402,348

(22) Filed: Jan. 10, 2017

(51) Int. Cl.
| A47C 31/04 | (2006.01) |
| A47C 7/28  | (2006.01) |
| F16B 2/00  | (2006.01) |
| F16B 2/22  | (2006.01) |
| A47C 7/40  | (2006.01) |

(52) U.S. Cl.
CPC .............. *A47C 31/04* (2013.01); *A47C 7/282* (2013.01); *A47C 7/40* (2013.01); *F16B 2/005* (2013.01); *F16B 2/22* (2013.01)

(58) Field of Classification Search
CPC ........... A47C 31/04; A47C 7/22; A47C 7/282; A47C 7/40; Y10T 24/4727; F16B 2/005
USPC ............ 297/440.2, 440.22, 452.56; 160/395, 160/398, 399, 402
See application file for complete search history.

(56) References Cited

U.S. PATENT DOCUMENTS

| 2,159,383 | A | * | 5/1939 | Jones | A47C 31/02 |
| | | | | | 24/265 C |
| 2,349,226 | A | * | 5/1944 | Thomas | E06B 9/54 |
| | | | | | 160/273.1 |
| 2,832,399 | A | * | 4/1958 | Varkala | A47C 31/04 |
| | | | | | 160/397 |
| 5,015,034 | A | * | 5/1991 | Kindig | A47C 7/70 |
| | | | | | 160/380 |
| 5,836,655 | A | * | 11/1998 | Laufer | A47C 5/06 |
| | | | | | 160/392 |
| 6,550,866 | B1 | | 4/2003 | Su | |
| 8,029,066 | B2 | * | 10/2011 | Su | A47C 31/023 |
| | | | | | 297/440.11 |
| 2002/0195863 | A1 | * | 12/2002 | Su | A47C 7/282 |
| | | | | | 297/440.11 |
| 2011/0181092 | A1 | * | 7/2011 | Lin | A47C 7/282 |
| | | | | | 297/452.18 |

FOREIGN PATENT DOCUMENTS

| GB | 1163492 A * | 9/1969 | ............ A47C 31/04 |
| TW | M440717 U1 | 11/2012 | |

\* cited by examiner

*Primary Examiner* — Robert Canfield
(74) *Attorney, Agent, or Firm* — Rosenberg, Klein & Lee

(57) ABSTRACT

A net fixing structure of a chair, which comprises a frame, a net, and clamping fixtures, is provided. The frame has an embedded channel. A positioning strip is disposed on the periphery of the net. An antiskid layer is disposed on the outside of the positioning strip. The clamping fixtures correspondingly clamp the antiskid layer. Thereby, when the net can be correspondingly inserted into the frame, the positioning strip around the periphery of the net can be correspondingly intercalated into the embedded channel, so that the clamping fixtures can be engaged in the embedded channel. Moreover, the antiskid layer has antiskid effect, such that the net won't slip and fall off under stress. The net can be stably fixed on the frame above.

8 Claims, 4 Drawing Sheets

NET FIXING STRUCTURE OF CHAIR

BACKGROUND

Field of Invention

The disclosure relates to a net fixing structure of a chair, especially a net fixing structure to be used on a back or a seat of a chair to stably fix the net, so that the net won't fall off.

Description of Related Art

Chairs are one of the necessary furniture. With the social progress, the requirement of the chairs' quality is also getting higher and higher, and various chairs are developed to meet the needs of various functions or places. The early chairs are only required to have practical sitting functions. At the present, in addition to the sitting function, the chairs also need to have a chic appearance and ergonomic design, as well as the use of a breathable material and comfort reclination. Therefore, the current industry-designed chairs were designed to meet the ergonomic shape in every part of the chairs, so that most people can have better comfortable feeling after sitting down. In addition to the comfortable use, the chairs also need easy operations to have the required functions. The comfort of the chairs will be elevated by assembling the components contacting human bodies. For example, the back of a chair is changed from traditional physical form into a breathable net form.

Traditional net cloth chairs comprise a back frame having a predetermined shape, a casing frame disposed on the inner periphery of the back frame, a net cloth with a suitable elasticity, and several screws. In practice, the breathable net cloth is laid on the back frame, and one side of the casing frame is correspondingly pressed into the back frame to fix the net cloth. Next, the several screws are screwed into each of the holes on the rear side of the back frame and locked into the corresponding portions of the casing frame. Hence, a desired tight positioning is generated on the net cloth held between to assemble a breathable chair back. After assembling the chair back, the expected breathable and comfortable elastic lying functions can be met. However, using screws to lock the back frame, net cloth, and the casing frame needs to turn around the chair back to let the rear side of the chair back face the operator, after laying the net cloth on the back frame. Hence, the assembling process is not convenient. Moreover, the screws are directly exposed on the rear side of the chair back, and thus it is not beautiful.

U.S. Pat. No. 6,550,866 B1 discloses a chair backrest with ventilating function. The chair backrest comprises a frame, a support member, a net, an outer member and a pillow. In assembly, the support member is mounted in a groove of the frame and then fixed by means of extending fasteners through the fixing holes. Next, the net and the outer member are assembled in a manner that the outer member covers the net and the fasteners of the frame to increase the assembly integrity. However, the assembly way of this US patent needs the outer member to fix the net and the frame, in addition to the fasteners. Hence, there are drawbacks of complex assembly and increased cost.

Patent number TW M440717 U1 discloses a net fixing base structure. The net fixing base structure comprises a back frame with a predetermined shape, a casing frame with a shape according to the shape of the back frame, several screws, a breathable net or cloth, a flexible support member having a predetermined shape. A receiving area is concavely disposed on the front side of the back frame, and a cut-off section is convexly disposed on the rear periphery of the casing frame. Several holes are disposed on the front side of the casing frame. Therefore, the screws can penetrate the holes of the casing frame for locking the casing frame onto the corresponding positions of the back frame. A ring-cutting space is reserved after the casing frame is inserted into the receiving area for receiving the net or cloth of the flexible support member laid on the casing frame. Hence, the peripherally disposed support member is tightly pressed into the ring-cutting space between the casing frame and the back frame. Therefore, the chair back with the breathable net or cloth can exactly and quickly position the net cloth. At the same time, the demands of easy disassembling, easy recycling, and classified environmental protection can be satisfied. Furthermore, the screws for locking the casing frame and the back frame can be covered by the net or the cloth. However, still some drawbacks are existed in the structure above. The drawbacks of the above structure are illustrated below.

1. The net support member is inserted into the ring-cutting space between the casing frame and the back farmer. Hence, the support member and the ring-cutting space are only in a tight condition, and no effective combining techniques, such as fasteners and clamping components, are used. Therefore, the support member can easily escape from the ring-cutting space.

2. Accordingly, the net cloth is elastic, slipping, and toughening. Therefore, when the net cloth is assembled in the ring-cutting space, the net cloth can easily slide off from the ring-cutting space, and thus cannot be effectively assembled and positioned.

Therefore, in view of drawbacks above, the inventors develop a net fixing structure of chairs by the many-year manufacturing and design experience and knowledge in the related fields and ingenuity to provide better practical value.

SUMMARY

In one aspect, this invention provides a net fixing structure of a chair, especially a net fixing structure used on a back or a seat of a chair to stably fix the net without falling off.

The net fixing structure of a chair comprises a frame, a net, and several clamping fixtures. The frame has an embedded channel. A positioning strip is disposed on the periphery of the net. An antiskid layer is disposed on the outside of the positioning strip. The plurality of the clamping fixtures correspondingly clamp the antiskid layer. Thereby, when the net can be correspondingly inserted into the frame, the positioning strip around the periphery of the net can be correspondingly intercalated into the embedded channel, so that the clamping fixtures can be engaged in the embedded channel. Moreover, the antiskid layer has antiskid effect, such that the net won't slip and fall off under stress. The net can be stably fixed on the frame above.

In the net fixing structure above, the positioning strip is coated by the periphery of the net and fixed by sewing.

In the net fixing structure above, the antiskid layer is an antiskid cloth sewed on the periphery of the net and the outside of the positioning strip.

In the net fixing structure above, the clamping fixtures each comprises a bent part, a first clip part, a second clip part, and a gripping part. Two ends of the bent part are extended to form the first clip part and the second clip part, and a space is formed between the first clip part and the second clip part. The net coated by the antiskid layer is disposed in the space. The gripping part is corresponding to the first clip part to clamp the net.

In the net fixing structure above, a plurality outer hooks disposed on the outside of the first clip part and the second clip part to be inserted and positioned in the embedded channel of the frame.

In light of the foregoing, the components of the structure and practical use of this invention has the following advantages, comparing with the conventional structure:

1. In this invention, the net fixing structure of chairs uses the clamping fixtures to clamp the net, and the clamping fixtures are correspondingly engaged in the embedded channel to achieve stable fixing effect.

2. In this invention, the net fixing structure of chairs uses the antiskid layer to let the periphery of the net can be correspondingly intercalated into the embedded channel to have antiskid effect with the embedded channel. Therefore, the net won't slip and fall off under stress.

3. In the net fixing structure of chairs of this invention, the position strip and the net were first sewed, and the antiskid layer was then sewed to let the periphery of the net has a suitable thickness and anti-pulling effect. Therefore, the net can be stably fixed without slipping off after being inserted into the embedded channel.

DETAILED DESCRIPTION

To more completely and clearly illustrate the technical means and effects of this invention, the detailed descriptions are set forth below. Please refer to the disclosed figures and the reference numbers.

Figure 1:
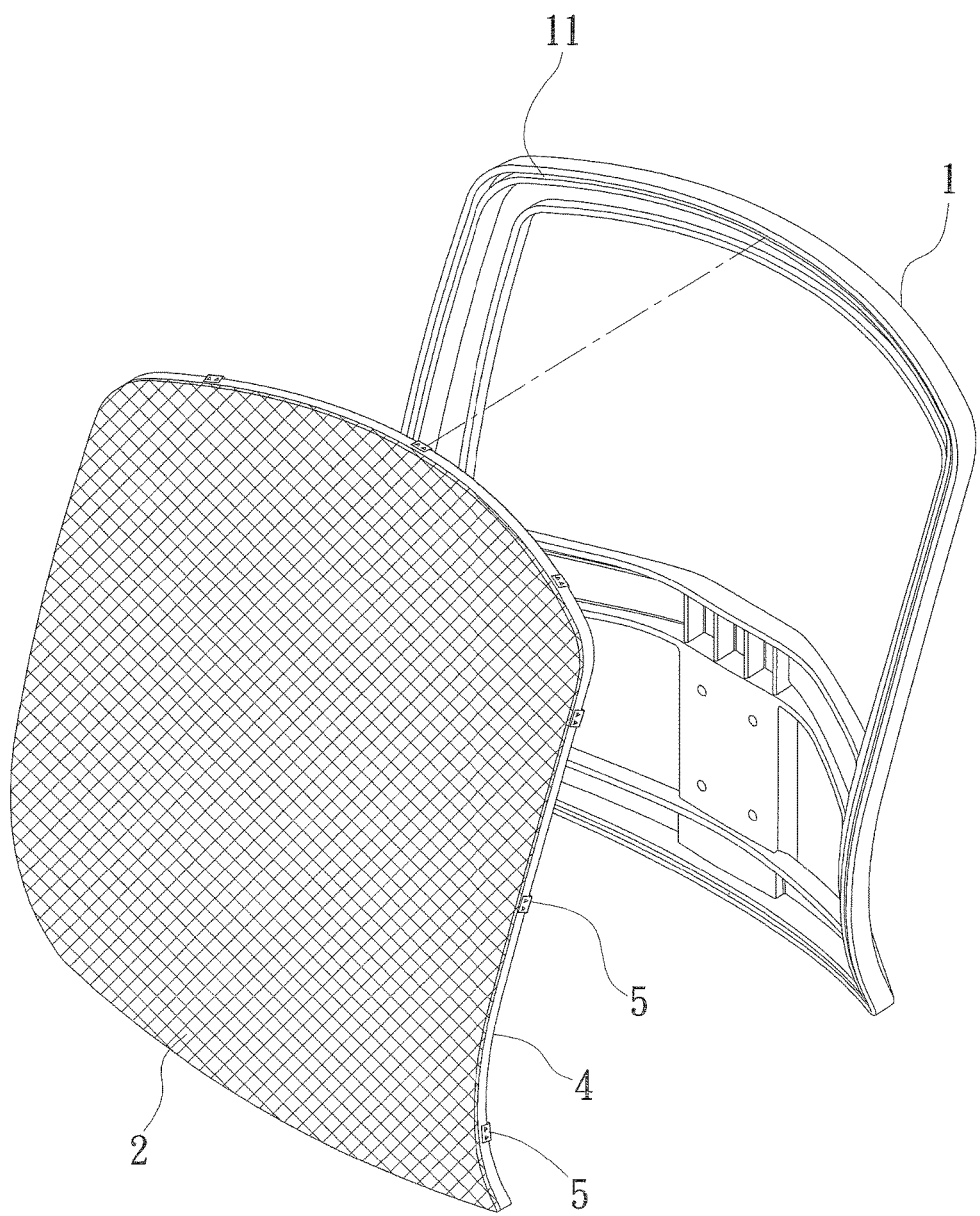
FIG. 1 is a perspective explosive view of this invention.
Figure 2:
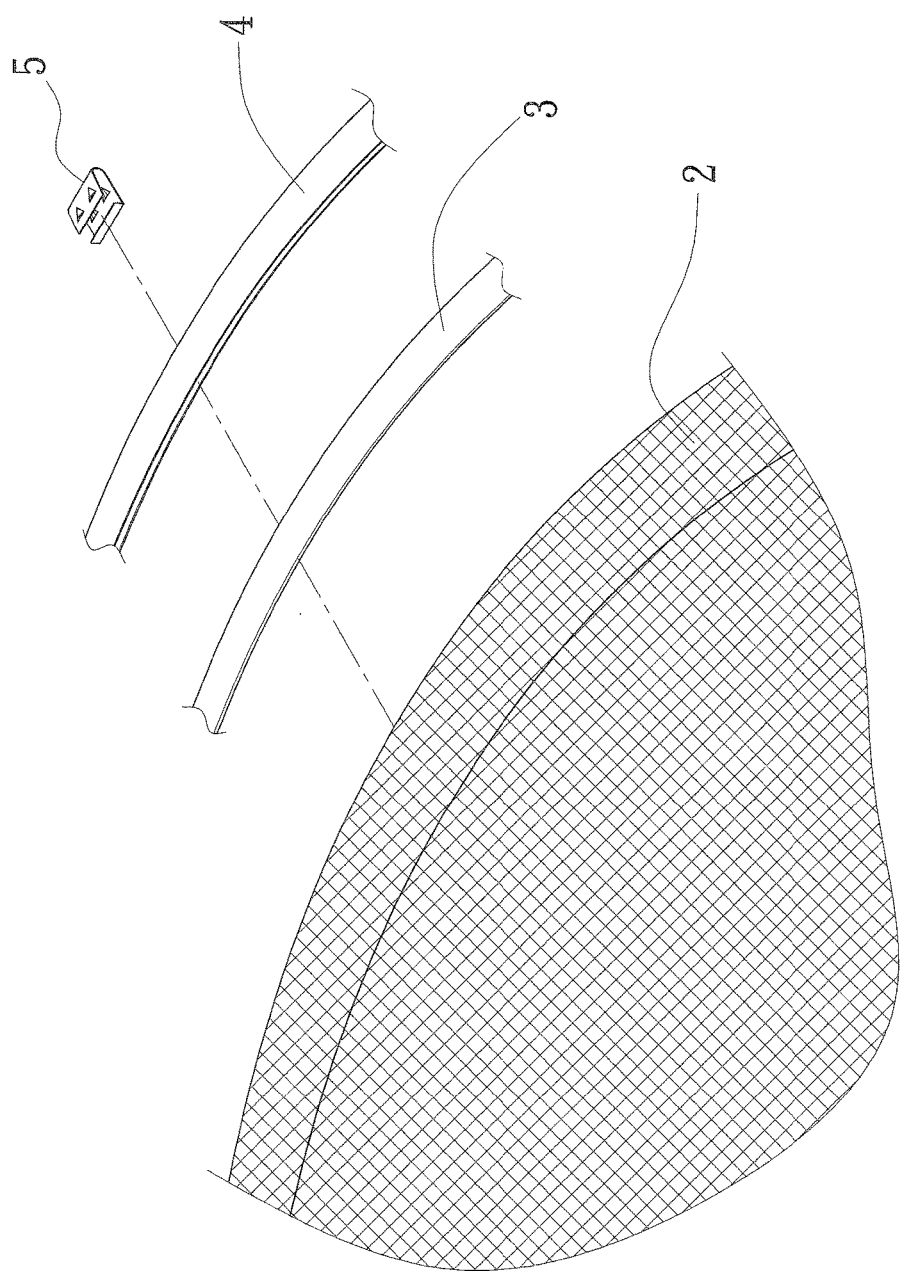
FIG. 2 is a perspective explosive view of a net of this invention.
Figure 3:
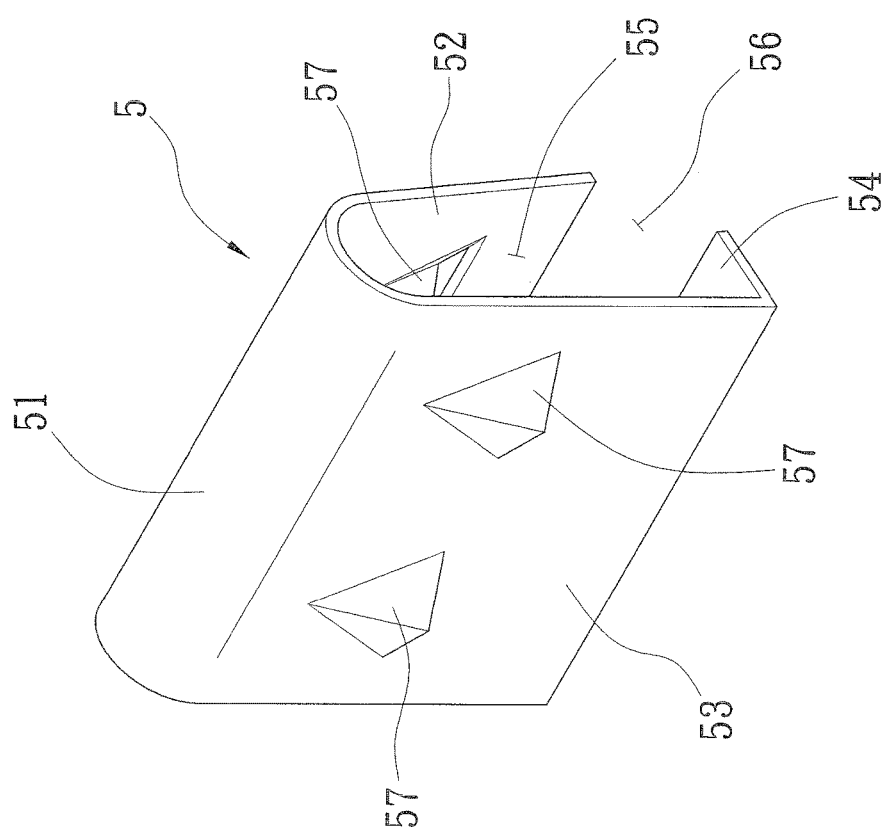
FIG. 3 is a perspective outlook of a clamping fixture of this invention.
Figure 4:
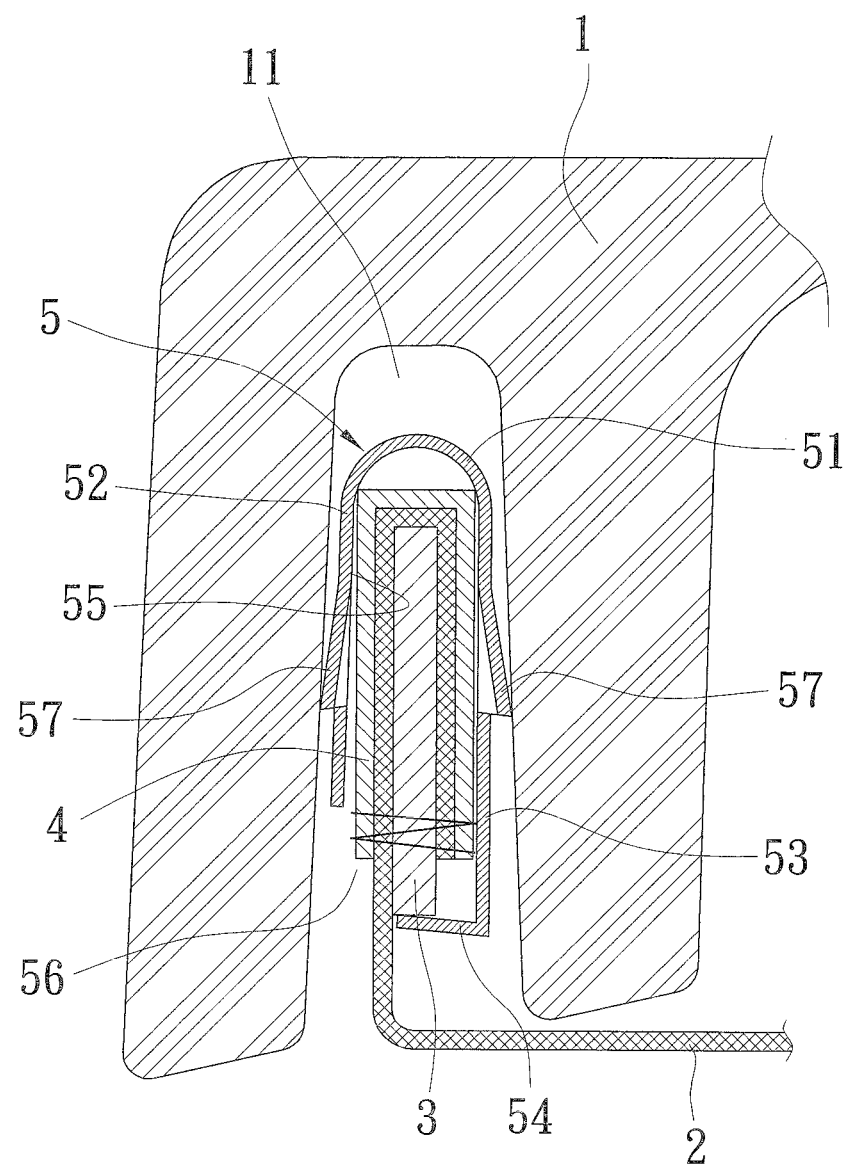
FIG. 4 is a cross-sectional assembling diagram of this invention.

First, please refer to FIGS. 1 and 2, which are diagrams showing a net fixing structure of a chair. The net fixing structure comprising:

a frame 1 having an embedded channel 11 disposed on a peripheral thereof;

a net 2 and a peripheral thereof intercalated in the embedded channel 11;

a positioning strip 3 combined and disposed on the periphery of the net 2;

an antiskid layer 4 coating on the periphery of the net 2 and the outside of the positioning strip 3; and a plurality of clamping fixtures 5 respectively clamping the outside of the antiskid layer 4 and inserted in the embedded channel 11.

Please refer to FIGS. 1-4. The net fixing structure above may be used to fix a net on a back or a seat of a chair when the frame 1 is a back frame or a seat frame. Before the net 2 is positioned in the embedded channel 11, the positioning strip 3 is combined with the periphery of the net 2. The positioning strip 3 surrounding the periphery of the net 2 and coated by the periphery of the net 2 and sewn fixed. Next, the antiskid layer 4 is combined with the outside of the periphery of the net 2. Furthermore, the antiskid layer 4 may be formed by coating a layer of an antiskid material, or sewing an antiskid cloth on the periphery of the net 2 and the outside of the positioning strip 3.

Subsequently, several clamping fixtures 5 clamp the outside of the antiskid layer 4. The clamping fixtures 5 each comprises a bent part 51, a first clip part 52, a second clip part 53, and a gripping part 54. Two ends of the bent part 51 are extended to form the first clip part 52 and the second clip part 53, and a space 55 is formed between the first clip part 52 and the second clip part 53. The net 2 coated by the antiskid layer 4 is disposed in the space 55. One end of the second clip part 53 is extended to form the gripping part 54. The gripping part 54 is corresponding to the first clip part 52 to form an opening 56. The gripping part 54 and the first clip part 52 may be pressed to fix the net 2. Next, outer hooks 57 are disposed on the outside of the first clip part 52 and the second clip part 53 to be inserted and positioned in the embedded channel 11 of the frame 1. Therefore, the net 2 can be stably combined with the frame 1.

From the disclosure above, it can be known that the clamping fixtures 5 are disposed to correspondingly clamp the net 2 and also to be correspondingly inserted into the embedded channel 11 of the frame 1 to achieve a good stable positioning effect. The antiskid layer 4 disposed on the outer periphery of the net 2 can stop the slipping of the net 2 after the periphery of the net 2 is inserted into the embedded channel 11. Hence, the net 2 won't fall off under stress. Furthermore, the positioning strip 3 and the net 2 are sewed first and the antiskid layer 4 are sewed next to let the periphery of the net 2 has a suitable thickness and anti-pulling effect. Therefore, the net 2 can be stably fixed without slipping after being inserted into the embedded channel 11.

What is claimed is:

1. A net fixing structure of a chair, comprising:
   a frame having an embedded channel disposed on a peripheral thereof;
   a net and a peripheral thereof intercalated in the embedded channel;
   a positioning strip combined and disposed on the periphery of the net;
   an antiskid layer coating on the periphery of the net and an outside of the positioning strip; and
   a plurality of clamping fixtures respectively clamping the outside of the antiskid layer and inserted in the embedded channel.

2. The net fixing structure of claim 1, wherein the frame is a back frame or a seat frame of the chair.

3. The net fixing structure of claim 1, wherein the positioning strip is coated by the periphery of the net and fixed by sewing.

4. The net fixing structure of claim 2, wherein the antiskid layer is an antiskid cloth sewed on the periphery of the net and the outside of the positioning strip.

5. The net fixing structure of claim 4, wherein the clamping fixtures each comprises:
   a bent part having two ends;
   a first clip part and a second clip part disposed on two ends of the bent part to form a space between the first clip part and the second clip part, wherein the net coated by the antiskid layer is disposed in the space;
   a gripping part disposed on one end, opposite to the bent part, of the second clip part, wherein an opening is formed between the gripping part and the first clip part; and
   a plurality outer hooks disposed on the outside of the first clip part and the second clip part to be inserted and positioned in the embedded channel of the frame.

6. The net fixing structure of claim 2, wherein the antiskid layer is an antiskid material coated on the periphery of the net and the outside of the positioning strip.

7. The net fixing structure of claim 6, wherein the clamping fixtures each comprises:
  a bent part having two ends;
  a first clip part and a second clip part disposed on two ends of the bent part to form a space between the first clip part and the second clip part, wherein the net coated by the antiskid layer is disposed in the space;
  a gripping part disposed on one end, opposite to the bent part, of the second clip part, wherein an opening is formed between the gripping part and the first clip part; and
  a plurality outer hooks disposed on the outside of the first clip part and the second clip part to be inserted and positioned in the embedded channel of the frame.

8. The net fixing structure of claim 2, wherein the clamping fixtures each comprises:
  a bent part having two ends;
  a first clip part and a second clip part disposed on two ends of the bent part to form a space between the first clip part and the second clip part, wherein the net coated by the antiskid layer is disposed in the space;
  a gripping part disposed on one end, opposite to the bent part, of the second clip part, wherein an opening is formed between the gripping part and the first clip part; and
  a plurality outer hooks disposed on the outside of the first clip part and the second clip part to be inserted and positioned in the embedded channel of the frame.

* * * * *